United States Patent
Long et al.

(10) Patent No.: US 11,935,662 B2
(45) Date of Patent: Mar. 19, 2024

(54) ELONGATE SIC FUEL ELEMENTS

(71) Applicant: WESTINGHOUSE ELECTRIC COMPANY LLC, Cranberry Township, PA (US)

(72) Inventors: Yun Long, Allison Park, PA (US); Peng Xu, Columbia, SC (US); Edward J. Lahoda, Edgewood, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 245 days.

(21) Appl. No.: 16/459,764

(22) Filed: Jul. 2, 2019

(65) Prior Publication Data

US 2021/0005334 A1    Jan. 7, 2021

(51) Int. Cl.
    *G21C 3/38*    (2006.01)
    *G21C 3/07*    (2006.01)
    *G21C 3/16*    (2006.01)
    *G21C 3/04*    (2006.01)

(52) U.S. Cl.
    CPC ............. *G21C 3/38* (2013.01); *G21C 3/07* (2013.01); *G21C 3/16* (2013.01); *G21C 3/047* (2019.01)

(58) Field of Classification Search
    CPC ........ G21C 3/045; G21C 3/047; G21C 3/048; G21C 3/38; G21C 3/06; G21C 3/07; G21C 3/36; G21C 3/02; G21C 3/18; G21C 3/28
    See application file for complete search history.

(56) References Cited

U.S. PATENT DOCUMENTS

| | | | |
|---|---|---|---|
| 3,173,843 A | | 3/1965 | Simpson |
| 3,175,955 A | * | 3/1965 | Cheverton ............... G21C 7/04 |
| | | | 376/419 |
| 3,244,599 A | * | 4/1966 | Hildebrand ............. G21C 3/58 |
| | | | 376/454 |
| 3,297,543 A | | 1/1967 | Jessen et al. |
| 3,586,745 A | | 6/1971 | Triggiani et al. |
| 3,855,061 A | | 12/1974 | Triggiani et al. |
| 4,038,135 A | | 7/1977 | Bergougnoux et al. |
| 4,224,106 A | | 9/1980 | Delafosse |

(Continued)

FOREIGN PATENT DOCUMENTS

| | | |
|---|---|---|
| CN | 108140432 A | 6/2018 |
| EP | 1309735 A2 | 5/2003 |

(Continued)

OTHER PUBLICATIONS

Tas, Fatma Burcu, and Sule Ergun. "Effects of pellet-to-cladding gap design parameters on the reliability of high burnup PWR fuel rods under steady state and transient conditions." Energy conversion and management 72 (2013): 88-93. (Year: 2013).*

(Continued)

*Primary Examiner* — Sharon M Davis
(74) *Attorney, Agent, or Firm* — K&L Gates LLP

(57) ABSTRACT

An elongate fuel element is described that has a silicon carbide cladding enclosing a fuel, such as $UO_2$, wherein the fuel is dimensioned relative to the cladding to define gaps at each lateral end of the enclosure sufficiently large such that upon swelling in use, the fuel does not increase the strain on the cladding beyond the limits of the claddings strain tolerance. The lateral gaps at the ends of the fuel allow lateral expansion during swelling that reduces the strain on the cladding.

20 Claims, 3 Drawing Sheets

(56) References Cited

U.S. PATENT DOCUMENTS

| | | | |
|---|---|---|---|
| 6,151,376 A * | 11/2000 | Nylund | G21C 3/322 376/445 |
| 6,258,402 B1 | 7/2001 | Hussary et al. | |
| 6,365,222 B1 | 4/2002 | Wagner et al. | |
| 6,491,208 B2 | 12/2002 | James et al. | |
| 6,502,767 B2 | 1/2003 | Kay et al. | |
| 6,576,861 B2 | 6/2003 | Sampath et al. | |
| 6,640,635 B2 | 11/2003 | Nakatsuka | |
| 6,670,808 B2 | 12/2003 | Nath et al. | |
| 6,723,379 B2 | 4/2004 | Stark | |
| 6,759,085 B2 | 7/2004 | Muehlberger | |
| 6,777,930 B2 | 8/2004 | Fischer | |
| 6,780,458 B2 | 8/2004 | Seth et al. | |
| 6,845,929 B2 | 1/2005 | Dolatabadi et al. | |
| 6,872,425 B2 | 3/2005 | Kaufold et al. | |
| 6,876,195 B2 | 4/2005 | Pigelet et al. | |
| 6,895,066 B1 | 5/2005 | Busch et al. | |
| 6,928,132 B2 | 8/2005 | Droege | |
| 7,066,375 B2 | 6/2006 | Bolser | |
| 7,097,431 B2 | 8/2006 | Englander et al. | |
| 7,143,967 B2 | 12/2006 | Heinrich et al. | |
| 7,144,648 B2 | 12/2006 | Tawfik et al. | |
| 7,201,940 B1 | 4/2007 | Kramer | |
| 7,293,597 B2 | 11/2007 | Parko, Jr. et al. | |
| 7,360,678 B2 | 4/2008 | Pietruska et al. | |
| 7,367,488 B2 | 5/2008 | Payne et al. | |
| 7,388,369 B2 | 6/2008 | Edsinger et al. | |
| 7,393,559 B2 | 7/2008 | Groza et al. | |
| 7,402,277 B2 | 7/2008 | Ayer et al. | |
| 7,479,299 B2 | 1/2009 | Raybould et al. | |
| 7,543,764 B2 | 6/2009 | Haynes et al. | |
| 7,553,385 B2 | 6/2009 | Haynes | |
| 7,618,500 B2 | 11/2009 | Farmer et al. | |
| 7,621,466 B2 | 11/2009 | Ko et al. | |
| 7,626,124 B2 | 12/2009 | Okamoto | |
| 7,631,816 B2 | 12/2009 | Jabado et al. | |
| 7,632,592 B2 | 12/2009 | Vyas et al. | |
| 7,637,441 B2 | 12/2009 | Heinrich et al. | |
| 7,654,223 B2 | 2/2010 | Kim et al. | |
| 7,740,905 B2 | 6/2010 | Jabado et al. | |
| 7,753,653 B2 | 7/2010 | Cairo et al. | |
| 7,757,652 B2 | 7/2010 | Miyamoto et al. | |
| 7,835,482 B2 | 11/2010 | Sato et al. | |
| 7,859,257 B2 | 12/2010 | Magnusson et al. | |
| 7,875,131 B2 | 1/2011 | Pandey | |
| 7,877,888 B2 | 2/2011 | Batzinger et al. | |
| 7,910,051 B2 | 3/2011 | Zimmermann et al. | |
| 7,967,055 B2 | 6/2011 | Parkos, Jr. et al. | |
| 8,002,912 B2 | 8/2011 | Pandey | |
| 8,020,509 B2 | 9/2011 | Calla et al. | |
| 8,021,715 B2 | 9/2011 | Jensen et al. | |
| 8,052,224 B2 | 11/2011 | Luo et al. | |
| 8,075,712 B2 | 12/2011 | Farmer | |
| 8,132,740 B2 | 3/2012 | Maev et al. | |
| 8,147,982 B2 | 4/2012 | Schlichting et al. | |
| 8,168,289 B2 | 5/2012 | Seth et al. | |
| 8,187,720 B2 | 5/2012 | Choi et al. | |
| 8,192,799 B2 | 6/2012 | Kay et al. | |
| 8,197,895 B2 | 6/2012 | Arndt et al. | |
| 8,231,936 B2 | 7/2012 | Song et al. | |
| 8,247,050 B2 | 8/2012 | McCrea et al. | |
| 8,252,376 B2 | 8/2012 | Buergel et al. | |
| 8,261,444 B2 | 9/2012 | Calla et al. | |
| 8,282,019 B2 | 10/2012 | Karimi Esfahani et al. | |
| 8,293,378 B2 | 10/2012 | Owen et al. | |
| 8,313,042 B2 | 11/2012 | Vanderzwet et al. | |
| 8,336,202 B2 | 12/2012 | Okamoto | |
| 8,343,573 B2 | 1/2013 | Jensen et al. | |
| 8,389,051 B2 | 3/2013 | Freudenberger et al. | |
| 8,389,059 B2 | 3/2013 | Kusinski et al. | |
| 8,389,066 B2 | 3/2013 | Vijay | |
| 8,389,126 B2 | 3/2013 | Kusinski et al. | |
| 8,394,473 B2 | 3/2013 | Mccrea et al. | |
| 8,486,249 B2 | 7/2013 | Almond et al. | |
| 8,491,959 B2 | 7/2013 | Miller et al. | |
| 8,505,806 B2 | 8/2013 | Totino et al. | |
| 8,524,053 B2 | 9/2013 | Farmer et al. | |
| 8,535,755 B2 | 9/2013 | Ajdelsztajn | |
| 8,536,860 B2 | 9/2013 | Boenisch | |
| 8,544,769 B2 | 10/2013 | Calla et al. | |
| 8,580,350 B2 | 11/2013 | Choi et al. | |
| 8,591,986 B1 | 11/2013 | Ajdelsztajn et al. | |
| 8,597,724 B2 | 12/2013 | Bunting et al. | |
| 8,601,663 B2 | 12/2013 | Ngo et al. | |
| 8,609,187 B1 | 12/2013 | Kang et al. | |
| 8,651,394 B2 | 2/2014 | Heinrich et al. | |
| 8,691,014 B2 | 4/2014 | Vijay | |
| 8,697,184 B2 | 4/2014 | Hertter et al. | |
| 8,699,654 B2 | 4/2014 | Magnusson et al. | |
| 8,703,234 B2 | 4/2014 | Song | |
| 8,728,572 B2 | 5/2014 | Berek et al. | |
| 8,737,557 B2 | 5/2014 | Pop et al. | |
| 8,739,404 B2 | 6/2014 | Bunker et al. | |
| 8,741,392 B2 | 6/2014 | McCrea et al. | |
| 8,778,459 B2 | 7/2014 | Farmer et al. | |
| 8,778,460 B2 | 7/2014 | Farmer | |
| 8,783,584 B2 | 7/2014 | Fukanuma | |
| 8,802,191 B2 | 8/2014 | Zimmermann et al. | |
| 8,883,250 B2 | 11/2014 | Miller et al. | |
| 8,916,248 B2 | 12/2014 | McCrea et al. | |
| 8,958,989 B2 | 2/2015 | Legendre et al. | |
| 8,971,476 B2 | 3/2015 | Mazzoccoli et al. | |
| 9,021,696 B2 | 5/2015 | Jakimov et al. | |
| 9,031,183 B2 | 5/2015 | Sato | |
| 9,040,116 B2 | 5/2015 | Jakimov et al. | |
| 9,067,282 B2 | 6/2015 | Sharp | |
| 9,095,858 B2 | 8/2015 | Fukanuma | |
| 9,096,035 B2 | 8/2015 | Sachdev et al. | |
| 9,109,291 B2 | 8/2015 | Lamberton et al. | |
| 9,138,838 B2 | 9/2015 | Calla et al. | |
| 9,140,130 B2 | 9/2015 | Mironets et al. | |
| 9,168,546 B2 | 10/2015 | Xue et al. | |
| 9,186,712 B1 | 11/2015 | Wright | |
| 9,260,784 B2 | 2/2016 | Jakimov et al. | |
| 9,273,400 B2 | 3/2016 | Nardi et al. | |
| 9,306,374 B2 | 4/2016 | Nakayama et al. | |
| 9,336,909 B2 | 5/2016 | Mazzoccoli et al. | |
| 9,337,002 B2 | 5/2016 | Daugherty et al. | |
| 9,347,136 B2 | 5/2016 | Verrier et al. | |
| 9,352,342 B2 | 5/2016 | Vlcek et al. | |
| 9,358,644 B2 | 6/2016 | Heinrichsdorff et al. | |
| 9,362,127 B2 | 6/2016 | Krenzer et al. | |
| 9,365,918 B2 | 6/2016 | Binder et al. | |
| 9,365,930 B1 | 6/2016 | Wright | |
| 9,377,287 B2 | 6/2016 | Tian et al. | |
| 9,394,063 B2 | 7/2016 | Jackson et al. | |
| 9,394,598 B2 | 7/2016 | Sato | |
| 9,460,818 B2 | 10/2016 | Bergman | |
| 9,472,311 B2 | 10/2016 | Pop et al. | |
| 9,481,933 B2 | 11/2016 | Mohanty | |
| 9,482,105 B1 | 11/2016 | Gorokhovsky et al. | |
| 9,546,432 B2 | 1/2017 | Shih et al. | |
| 9,555,473 B2 | 1/2017 | Slattery | |
| 9,562,280 B2 | 2/2017 | Suhonen et al. | |
| 9,580,787 B2 | 2/2017 | Hofener et al. | |
| 9,593,930 B2 | 3/2017 | Lakhan et al. | |
| 9,598,774 B2 | 3/2017 | Ajdelsztajn et al. | |
| 9,599,210 B2 | 3/2017 | Hansen et al. | |
| 9,611,562 B2 | 4/2017 | Lancaster-Larocque et al. | |
| 9,611,803 B2 | 4/2017 | Vieira De Morais et al. | |
| 9,640,285 B2 | 5/2017 | Shin et al. | |
| 9,644,662 B2 | 5/2017 | Williamson | |
| 9,657,682 B2 | 5/2017 | Graham et al. | |
| 9,663,870 B2 | 5/2017 | Sun et al. | |
| 9,695,489 B1 | 7/2017 | Wright | |
| 9,758,875 B2 | 9/2017 | Verrier et al. | |
| 9,765,436 B2 | 9/2017 | Kennedy et al. | |
| 9,765,635 B2 | 9/2017 | Gorokhovsky | |
| 9,783,882 B2 | 10/2017 | Miller et al. | |
| 9,790,375 B2 | 10/2017 | Xu et al. | |
| 9,790,889 B2 | 10/2017 | Beerens et al. | |
| 9,857,171 B2 | 1/2018 | Fischer | |
| 9,879,348 B2 | 1/2018 | Sun et al. | |
| 9,892,824 B2 | 2/2018 | Perego et al. | |

(56) References Cited

U.S. PATENT DOCUMENTS

| | | |
|---|---|---|
| 9,911,511 B2 | 3/2018 | Ledford et al. |
| 9,938,834 B2 | 4/2018 | Blumer et al. |
| 9,995,178 B2 | 6/2018 | Schurhoff |
| 10,008,295 B2 | 6/2018 | Sato |
| 10,017,844 B2 | 7/2018 | Detor et al. |
| 10,077,499 B2 | 9/2018 | Sullivan et al. |
| 10,093,434 B2 | 10/2018 | Matthews et al. |
| 10,099,322 B2 | 10/2018 | Widener et al. |
| 10,100,412 B2 | 10/2018 | Nardi et al. |
| 10,119,195 B2 | 11/2018 | Mohanty et al. |
| 10,155,236 B2 | 12/2018 | Tan et al. |
| 10,161,048 B2 | 12/2018 | Kennedy et al. |
| 10,167,727 B2 | 1/2019 | Vargas et al. |
| 10,179,951 B2 | 1/2019 | Nardi et al. |
| 10,211,126 B2 | 2/2019 | Hamweendo et al. |
| 10,226,791 B2 | 3/2019 | Dardas et al. |
| 10,229,761 B2 | 3/2019 | Whittaker et al. |
| 10,273,822 B2 | 4/2019 | Strock et al. |
| 10,295,502 B2 | 5/2019 | Clavette et al. |
| 10,300,445 B2 | 5/2019 | Maev et al. |
| 10,301,950 B2 | 5/2019 | Garosshen |
| 10,311,985 B2 | 6/2019 | Thinguldstad et al. |
| 10,315,218 B2 | 6/2019 | Mahalingam et al. |
| 10,329,033 B2 | 6/2019 | Choi et al. |
| 10,329,432 B2 | 6/2019 | Magdefrau et al. |
| 10,395,784 B2 | 8/2019 | Ginsberg et al. |
| 10,410,753 B2 | 9/2019 | Cheatham, III et al. |
| 10,438,707 B2 | 10/2019 | Kito et al. |
| 10,441,962 B2 | 10/2019 | Widener et al. |
| 10,443,132 B1 | 10/2019 | El-Eskandarany et al. |
| 10,475,723 B1 | 11/2019 | Yeh et al. |
| 10,501,827 B2 | 12/2019 | Champagne, Jr. et al. |
| 10,533,818 B1 | 1/2020 | Champagne et al. |
| 10,596,629 B2 | 3/2020 | Slattery |
| 10,597,784 B2 | 3/2020 | McGee et al. |
| 10,598,186 B2 | 3/2020 | Cappuccini et al. |
| 10,626,489 B2 | 4/2020 | Grensing et al. |
| 10,633,719 B1 | 4/2020 | Wright |
| 10,648,085 B2 | 5/2020 | Reznik et al. |
| 10,677,340 B2 | 6/2020 | Hansen et al. |
| 10,702,939 B2 | 7/2020 | Binek et al. |
| 10,714,671 B2 | 7/2020 | Thuss |
| 10,746,524 B2 | 8/2020 | Qi |
| 10,808,323 B2 | 10/2020 | Nardi et al. |
| 2004/0037954 A1 | 2/2004 | Heinrich et al. |
| 2004/0126499 A1 | 7/2004 | Heinrich et al. |
| 2005/0016489 A1 | 1/2005 | Endicott et al. |
| 2005/0105669 A1 | 5/2005 | Roche et al. |
| 2005/0118485 A1 | 6/2005 | Tawfik et al. |
| 2006/0027687 A1 | 2/2006 | Heinrich et al. |
| 2006/0088755 A1 | 4/2006 | Tawfik et al. |
| 2006/0090593 A1 | 5/2006 | Liu |
| 2006/0093736 A1 | 5/2006 | Raybould et al. |
| 2006/0121183 A1 | 6/2006 | DeBiccari et al. |
| 2006/0121187 A1 | 6/2006 | Haynes et al. |
| 2006/0134320 A1 | 6/2006 | DeBiccari et al. |
| 2006/0134321 A1 | 6/2006 | DeBiccari et al. |
| 2006/0219329 A1 | 10/2006 | Hu et al. |
| 2006/0219330 A1 | 10/2006 | Hu et al. |
| 2006/0222776 A1 | 10/2006 | Madhava et al. |
| 2007/0031591 A1 | 2/2007 | Junker et al. |
| 2007/0076835 A1 | 4/2007 | Tobimatsu et al. |
| 2007/0098912 A1 | 5/2007 | Raybould et al. |
| 2007/0099014 A1 | 5/2007 | McCullough et al. |
| 2007/0278324 A1 | 12/2007 | Gartner et al. |
| 2008/0047222 A1 | 2/2008 | Barnes |
| 2008/0277458 A1 | 11/2008 | Kocak et al. |
| 2009/0061184 A1 | 3/2009 | Jaworowski et al. |
| 2009/0130327 A1 | 5/2009 | Erdmann et al. |
| 2009/0148622 A1 | 6/2009 | Stoltenhoff et al. |
| 2009/0256010 A1 | 10/2009 | Golna et al. |
| 2010/0015467 A1 | 1/2010 | Zimmermann et al. |
| 2010/0028706 A1 | 2/2010 | Hornschu et al. |
| 2010/0102808 A1 | 4/2010 | Boenisch |
| 2010/0119707 A1 | 5/2010 | Raybould et al. |
| 2010/0143700 A1 | 6/2010 | Champagne et al. |
| 2010/0155251 A1 | 6/2010 | Bogue et al. |
| 2010/0181391 A1 | 7/2010 | Gärtner et al. |
| 2010/0208862 A1* | 8/2010 | Lorenzo .................. G21C 3/36 376/432 |
| 2010/0272982 A1 | 10/2010 | Dickinson et al. |
| 2010/0288848 A1 | 11/2010 | Kamei |
| 2011/0003165 A1 | 1/2011 | Weber |
| 2011/0014055 A1 | 1/2011 | Hertter et al. |
| 2011/0020665 A1 | 1/2011 | Serafin et al. |
| 2011/0094439 A1 | 4/2011 | Stier |
| 2011/0129351 A1 | 6/2011 | Das et al. |
| 2011/0129600 A1 | 6/2011 | Das et al. |
| 2011/0174207 A1 | 7/2011 | Harrick et al. |
| 2011/0197953 A1 | 8/2011 | Pfeuffer |
| 2011/0314791 A1 | 12/2011 | Haynes et al. |
| 2011/0318497 A1 | 12/2011 | Beals et al. |
| 2012/0097322 A1 | 4/2012 | Pyritz et al. |
| 2012/0114868 A1 | 5/2012 | Bunker et al. |
| 2012/0177908 A1 | 7/2012 | Petorak et al. |
| 2012/0196151 A1 | 8/2012 | Schlichting et al. |
| 2012/0294409 A1 | 11/2012 | Yanagisawa et al. |
| 2013/0010915 A1* | 1/2013 | Garnier .................. G21C 3/17 376/417 |
| 2013/0034661 A1 | 2/2013 | Schneiderbanger et al. |
| 2013/0047394 A1 | 2/2013 | Cretegny et al. |
| 2013/0087633 A1 | 4/2013 | Fukanuma |
| 2013/0177437 A1 | 7/2013 | Amancherla et al. |
| 2014/0039830 A1 | 2/2014 | Huang |
| 2014/0057132 A1 | 2/2014 | Totino et al. |
| 2014/0069700 A1 | 3/2014 | Hirano et al. |
| 2014/0099494 A1 | 4/2014 | Choi et al. |
| 2014/0109861 A1 | 4/2014 | Korner et al. |
| 2014/0127400 A1 | 5/2014 | Zanon et al. |
| 2014/0230692 A1 | 8/2014 | Hofener et al. |
| 2014/0251255 A1 | 9/2014 | Beerens et al. |
| 2014/0272166 A1 | 9/2014 | Shim et al. |
| 2014/0315392 A1 | 10/2014 | Xu et al. |
| 2014/0342094 A1 | 11/2014 | Hofener et al. |
| 2015/0078505 A1 | 3/2015 | Xu et al. |
| 2015/0118485 A1 | 4/2015 | Wang et al. |
| 2015/0225301 A1 | 8/2015 | Schulz et al. |
| 2015/0247245 A1 | 9/2015 | Wali |
| 2015/0299863 A1 | 10/2015 | Champagne et al. |
| 2015/0321217 A1 | 11/2015 | Nardi et al. |
| 2015/0354376 A1 | 12/2015 | Garosshen |
| 2016/0024942 A1 | 1/2016 | Faughnan, Jr. et al. |
| 2016/0047052 A1 | 2/2016 | Baranovski et al. |
| 2016/0053380 A1 | 2/2016 | Klecka et al. |
| 2016/0090653 A1 | 3/2016 | Jensen et al. |
| 2016/0115797 A1 | 4/2016 | Calla et al. |
| 2016/0122557 A1 | 5/2016 | Magdefrau et al. |
| 2016/0168721 A1 | 6/2016 | Nardi et al. |
| 2016/0221014 A1 | 8/2016 | Nardi et al. |
| 2016/0245110 A1 | 8/2016 | Strock et al. |
| 2016/0251975 A1 | 9/2016 | Strock et al. |
| 2016/0273387 A1 | 9/2016 | Goepfert |
| 2016/0297039 A1 | 10/2016 | Simpson et al. |
| 2016/0319417 A1 | 11/2016 | Boileau et al. |
| 2016/0334049 A1 | 11/2016 | Weber |
| 2016/0340060 A1 | 11/2016 | Matthews et al. |
| 2016/0375451 A1 | 12/2016 | Hoiland et al. |
| 2017/0025195 A1 | 1/2017 | Pineiro Fernandez |
| 2017/0029959 A1 | 2/2017 | Lu et al. |
| 2017/0038342 A1 | 2/2017 | Clavette et al. |
| 2017/0057023 A1 | 3/2017 | Sharp et al. |
| 2017/0062080 A1* | 3/2017 | Cheatham, III ....... G21D 3/001 |
| 2017/0098482 A1 | 4/2017 | Yoshida |
| 2017/0114438 A1 | 4/2017 | Allcock |
| 2017/0130733 A1 | 5/2017 | Cappuccini et al. |
| 2017/0137949 A1 | 5/2017 | Bahraini Hasani et al. |
| 2017/0173611 A1 | 6/2017 | Tan et al. |
| 2017/0253977 A1 | 9/2017 | Champagne et al. |
| 2017/0333934 A1 | 11/2017 | Le Do |
| 2017/0369187 A1 | 12/2017 | Choi et al. |
| 2018/0025794 A1 | 1/2018 | Lahoda et al. |
| 2018/0042119 A1 | 2/2018 | Dantin et al. |
| 2018/0050391 A1 | 2/2018 | Maev et al. |
| 2018/0096743 A1 | 4/2018 | Lahoda et al. |

(56) References Cited

U.S. PATENT DOCUMENTS

| | | |
|---|---|---|
| 2018/0163548 A1 | 6/2018 | Srinivasan et al. |
| 2018/0180125 A1 | 6/2018 | Hollis |
| 2018/0190395 A1 | 7/2018 | Clarkson et al. |
| 2018/0200755 A1 | 7/2018 | Dardas et al. |
| 2018/0223870 A1 | 8/2018 | Parthasarathy et al. |
| 2018/0240558 A1 | 8/2018 | Sato et al. |
| 2018/0245194 A1 | 8/2018 | Detor et al. |
| 2018/0254110 A1 | 9/2018 | Ledford et al. |
| 2018/0254114 A1 | 9/2018 | Lahoda et al. |
| 2018/0258539 A1 | 9/2018 | Wilson et al. |
| 2018/0274104 A1 | 9/2018 | Reznik et al. |
| 2018/0281317 A1 | 10/2018 | Gulizia et al. |
| 2018/0312976 A1 | 11/2018 | Wiley et al. |
| 2018/0327912 A1 | 11/2018 | Sullivan et al. |
| 2018/0355487 A1 | 12/2018 | Hirano |
| 2018/0361708 A1 | 12/2018 | Hirano |
| 2019/0010612 A1 | 1/2019 | Nardi et al. |
| 2019/0024241 A1 | 1/2019 | McGee et al. |
| 2019/0024242 A1 | 1/2019 | Binek et al. |
| 2019/0056356 A1 | 2/2019 | Le et al. |
| 2019/0085431 A1 | 3/2019 | Rios et al. |
| 2019/0088376 A1 | 3/2019 | Lahoda et al. |
| 2019/0094643 A1 | 3/2019 | Friedman et al. |
| 2019/0106996 A1 | 4/2019 | Vargas et al. |
| 2019/0164658 A1 | 5/2019 | Mazzoccoli et al. |
| 2019/0184417 A1 | 6/2019 | Binek et al. |
| 2019/0194817 A1 | 6/2019 | Sun et al. |
| 2019/0233946 A1 | 8/2019 | Bruton et al. |
| 2019/0235477 A1 | 8/2019 | Widener et al. |
| 2019/0264318 A1 | 8/2019 | Ke et al. |
| 2019/0308266 A1 | 10/2019 | Binek et al. |
| 2019/0329374 A1 | 10/2019 | Zhang et al. |
| 2019/0329906 A1 | 10/2019 | Cawthorne et al. |
| 2019/0330742 A1 | 10/2019 | Wu et al. |
| 2019/0337054 A1 | 11/2019 | Dardona et al. |
| 2019/0366355 A1 | 12/2019 | Binek et al. |
| 2019/0366362 A1 | 12/2019 | Binek et al. |
| 2019/0366363 A1 | 12/2019 | Binek et al. |
| 2019/0381525 A1 | 12/2019 | Widener et al. |
| 2020/0009657 A1 | 1/2020 | Teng et al. |
| 2020/0020455 A1 | 1/2020 | Lahoda |
| 2020/0023390 A1 | 1/2020 | Watkins et al. |
| 2020/0027591 A1 | 1/2020 | Wittaker et al. |
| 2020/0027595 A1 | 1/2020 | Thinguldstad et al. |
| 2020/0040201 A1 | 2/2020 | Song |
| 2020/0048761 A1 | 2/2020 | Kim et al. |
| 2020/0056277 A1 | 2/2020 | Kim et al. |
| 2020/0096308 A1 | 3/2020 | Hughes et al. |
| 2020/0102782 A1 | 4/2020 | Ortuzar et al. |
| 2020/0108405 A1 | 4/2020 | Fukanuma |
| 2020/0109465 A1 | 4/2020 | Cao et al. |
| 2020/0131644 A1 | 4/2020 | von Schleinitz |
| 2020/0157689 A1 | 5/2020 | Mccall et al. |
| 2020/0161010 A1 | 5/2020 | Lahoda et al. |
| 2020/0163397 A1 | 5/2020 | Ganor |
| 2020/0194334 A1 | 6/2020 | Robinson et al. |
| 2020/0215559 A1 | 7/2020 | Fukanuma |
| 2020/0216965 A1 | 7/2020 | Marinescu et al. |
| 2020/0227312 A1 | 7/2020 | Escher-Poeppel et al. |
| 2020/0232084 A1 | 7/2020 | Grensing et al. |
| 2020/0238375 A1 | 7/2020 | Poirier et al. |
| 2020/0240004 A1 | 7/2020 | Kim et al. |
| 2020/0247056 A1 | 8/2020 | Binek et al. |
| 2020/0278160 A1 | 9/2020 | Chipko et al. |
| 2020/0300094 A1 | 9/2020 | Mega et al. |
| 2020/0303614 A1 | 9/2020 | Thuss |
| 2020/0331064 A1 | 10/2020 | Sherman |
| 2020/0346401 A1 | 11/2020 | Brown et al. |
| 2020/0362462 A1 | 11/2020 | Braley et al. |
| 2020/0376507 A1 | 12/2020 | Ozdemir |
| 2020/0385842 A1 | 12/2020 | Sherman et al. |
| 2020/0391284 A1 | 12/2020 | Schepak et al. |
| 2022/0074055 A1 | 3/2022 | Braley et al. |

FOREIGN PATENT DOCUMENTS

| | | |
|---|---|---|
| EP | 1382719 A2 | 1/2004 |
| EP | 1092497 B1 | 4/2004 |
| EP | 1477579 A1 | 11/2004 |
| EP | 1558400 A1 | 8/2005 |
| EP | 1227296 B1 | 9/2005 |
| EP | 1393013 B1 | 9/2005 |
| EP | 1588445 A1 | 10/2005 |
| EP | 1462546 B1 | 5/2006 |
| EP | 1666635 A1 | 6/2006 |
| EP | 1666636 A1 | 6/2006 |
| EP | 1674594 A1 | 6/2006 |
| EP | 1593437 B1 | 10/2006 |
| EP | 1215493 B1 | 2/2007 |
| EP | 1382720 B1 | 2/2007 |
| EP | 1785503 A2 | 5/2007 |
| EP | 1806183 A1 | 7/2007 |
| EP | 1390152 B1 | 9/2007 |
| EP | 1829988 A1 | 9/2007 |
| EP | 1831426 A1 | 9/2007 |
| EP | 1854547 A1 | 11/2007 |
| EP | 1791645 B1 | 12/2007 |
| EP | 1878813 A1 | 1/2008 |
| EP | 1880035 A1 | 1/2008 |
| EP | 1880036 A2 | 1/2008 |
| EP | 1880038 A1 | 1/2008 |
| EP | 1902785 A1 | 3/2008 |
| EP | 1903126 A1 | 3/2008 |
| EP | 1903127 A1 | 3/2008 |
| EP | 1806429 B1 | 7/2008 |
| EP | 1966408 A2 | 9/2008 |
| EP | 1990444 A2 | 11/2008 |
| EP | 1904666 B1 | 12/2008 |
| EP | 2014794 A1 | 1/2009 |
| EP | 2014795 A1 | 1/2009 |
| EP | 1652601 B1 | 2/2009 |
| EP | 1700638 B1 | 3/2009 |
| EP | 1857183 B1 | 7/2009 |
| EP | 2102380 A2 | 9/2009 |
| EP | 2110178 A1 | 10/2009 |
| EP | 2113135 A2 | 11/2009 |
| EP | 2127759 A1 | 12/2009 |
| EP | 2154264 A1 | 2/2010 |
| EP | 2155419 A2 | 2/2010 |
| EP | 2027305 B1 | 5/2010 |
| EP | 2204473 A2 | 7/2010 |
| EP | 2206803 A1 | 7/2010 |
| EP | 1472701 B1 | 8/2010 |
| EP | 1578540 B1 | 1/2011 |
| EP | 1674595 B1 | 2/2011 |
| EP | 1816235 B1 | 3/2011 |
| EP | 2327812 A1 | 6/2011 |
| EP | 1817601 B1 | 7/2011 |
| EP | 2347447 A1 | 7/2011 |
| EP | 2348078 A1 | 7/2011 |
| EP | 2011964 B1 | 8/2011 |
| EP | 2350334 A2 | 8/2011 |
| EP | 2112241 B1 | 9/2011 |
| EP | 2422051 A2 | 2/2012 |
| EP | 2425032 A2 | 3/2012 |
| EP | 2438204 A1 | 4/2012 |
| EP | 2448709 A1 | 5/2012 |
| EP | 1925693 B1 | 6/2012 |
| EP | 2462257 A1 | 6/2012 |
| EP | 1685923 B1 | 7/2012 |
| EP | 2260119 B1 | 8/2012 |
| EP | 2188416 B1 | 9/2012 |
| EP | 2499278 A1 | 9/2012 |
| EP | 1506816 B1 | 1/2013 |
| EP | 2551023 A2 | 1/2013 |
| EP | 2564980 A2 | 3/2013 |
| EP | 2578337 A1 | 4/2013 |
| EP | 1971443 B1 | 5/2013 |
| EP | 2593575 A1 | 5/2013 |
| EP | 2598869 A1 | 6/2013 |
| EP | 2283487 B1 | 7/2013 |
| EP | 2612948 A2 | 7/2013 |
| EP | 2618070 A1 | 7/2013 |

(56) References Cited

FOREIGN PATENT DOCUMENTS

| | | |
|---|---|---|
| EP | 2623730 A1 | 8/2013 |
| EP | 2690195 A1 | 1/2014 |
| EP | 2691554 A1 | 2/2014 |
| EP | 2706129 A1 | 3/2014 |
| EP | 2108051 B1 | 4/2014 |
| EP | 2298962 B1 | 6/2014 |
| EP | 2737102 A2 | 6/2014 |
| EP | 2104753 B1 | 7/2014 |
| EP | 2766124 A1 | 8/2014 |
| EP | 2769073 A1 | 8/2014 |
| EP | 2560789 B1 | 10/2014 |
| EP | 2108120 B1 | 11/2014 |
| EP | 2205932 B1 | 3/2015 |
| EP | 2377967 B1 | 3/2015 |
| EP | 2688708 B1 | 8/2015 |
| EP | 2902530 A1 | 8/2015 |
| EP | 2783078 B1 | 10/2015 |
| EP | 2971247 A1 | 1/2016 |
| EP | 2981380 A1 | 2/2016 |
| EP | 2996814 A1 | 3/2016 |
| EP | 2778256 B1 | 4/2016 |
| EP | 1844181 B1 | 5/2016 |
| EP | 2072634 B1 | 5/2016 |
| EP | 2044594 B1 | 7/2016 |
| EP | 2835635 B1 | 7/2016 |
| EP | 2175050 B1 | 9/2016 |
| EP | 3069821 A2 | 9/2016 |
| EP | 2381218 B1 | 10/2016 |
| EP | 2974796 B1 | 5/2017 |
| EP | 3181237 A1 | 6/2017 |
| EP | 2657368 B1 | 8/2017 |
| EP | 2569460 B1 | 9/2017 |
| EP | 3218529 A2 | 9/2017 |
| EP | 2885125 B1 | 11/2017 |
| EP | 3241416 A1 | 11/2017 |
| EP | 2808643 B1 | 1/2018 |
| EP | 2859133 B1 | 1/2018 |
| EP | 3069354 B1 | 1/2018 |
| EP | 3275637 A1 | 1/2018 |
| EP | 2506981 B1 | 2/2018 |
| EP | 2626166 B1 | 3/2018 |
| EP | 3143286 B1 | 4/2018 |
| EP | 2179426 B1 | 5/2018 |
| EP | 3314037 A1 | 5/2018 |
| EP | 3017874 B1 | 7/2018 |
| EP | 2806049 B1 | 8/2018 |
| EP | 3088105 B1 | 8/2018 |
| EP | 2992123 B1 | 10/2018 |
| EP | 3049551 B1 | 10/2018 |
| EP | 3128321 B1 | 10/2018 |
| EP | 3396676 A1 | 10/2018 |
| EP | 2732072 B1 | 11/2018 |
| EP | 2737101 B1 | 11/2018 |
| EP | 3230492 B1 | 11/2018 |
| EP | 2737100 B1 | 12/2018 |
| EP | 2917918 B1 | 12/2018 |
| EP | 3155138 B1 | 12/2018 |
| EP | 3412796 A1 | 12/2018 |
| EP | 3095711 B1 | 1/2019 |
| EP | 3431186 A1 | 1/2019 |
| EP | 3431630 A1 | 1/2019 |
| EP | 2604723 B1 | 2/2019 |
| EP | 1999297 B1 | 3/2019 |
| EP | 3451376 A1 | 3/2019 |
| EP | 2110450 B1 | 5/2019 |
| EP | 2985424 B1 | 5/2019 |
| EP | 3488026 A1 | 5/2019 |
| EP | 2229241 B1 | 6/2019 |
| EP | 2921573 B1 | 6/2019 |
| EP | 3520116 A2 | 8/2019 |
| EP | 3525559 A1 | 8/2019 |
| EP | 3526369 A1 | 8/2019 |
| EP | 2884604 B1 | 10/2019 |
| EP | 3049189 B1 | 10/2019 |
| EP | 3546091 A1 | 10/2019 |
| EP | 3549713 A1 | 10/2019 |
| EP | 3572623 A1 | 11/2019 |
| EP | 3577321 A1 | 12/2019 |
| EP | 3578684 A1 | 12/2019 |
| EP | 3578689 A1 | 12/2019 |
| EP | 3578690 A1 | 12/2019 |
| EP | 3055445 B1 | 1/2020 |
| EP | 3168323 B1 | 1/2020 |
| EP | 3593358 A1 | 1/2020 |
| EP | 3604456 A1 | 2/2020 |
| EP | 3608441 A1 | 2/2020 |
| EP | 3631135 A1 | 4/2020 |
| EP | 3642377 A1 | 4/2020 |
| EP | 3008227 B1 | 5/2020 |
| EP | 3066232 B1 | 5/2020 |
| EP | 3647615 A1 | 5/2020 |
| EP | 3649272 A1 | 5/2020 |
| EP | 3649273 A1 | 5/2020 |
| EP | 3650581 A1 | 5/2020 |
| EP | 3655182 A1 | 5/2020 |
| EP | 3396021 B1 | 7/2020 |
| EP | 3677702 A1 | 7/2020 |
| EP | 3679602 A1 | 7/2020 |
| EP | 3689510 A1 | 8/2020 |
| EP | 3181727 B1 | 9/2020 |
| EP | 3066233 B1 | 11/2020 |
| EP | 3348670 B1 | 11/2020 |
| EP | 3733933 A1 | 11/2020 |
| EP | 3739082 A1 | 11/2020 |
| EP | 3245007 B1 | 12/2020 |
| EP | 3746581 A1 | 12/2020 |
| WO | WO-2011067274 A1 * 6/2011 | ............. G21C 21/02 |

OTHER PUBLICATIONS

Translation of WO 2011067274 (Year: 2011).*
Mark D. Dehart, et al., Fuel Element Design and Analysis for Potential LEU Conversion of the Advanced Test Reactor, INL/JOU-17-41538-Revision-0, U.S. Department of Energy National Laboratory operated by Battelle Energy Alliance, Apr. 2018.
Samuel J. Miller, et al., Evaluation of U10Mo Fuel Plate Irradiation Behavior Via Numerical and Experimental Benchmarking, ASME 2012 IMECE, INL/con-12-25074 Preprint, U.S. Department of Energy National Laboratory operated by Battelle Energy Alliance, Nov. 2012.
Min-Gil Kim, et al., Comparison of Thermal Hydraulic Performances of Rod-Type Fuel to Plate-Type Fuel for Small Modular Reactor Application, Proceedings of ICAPP, Apr. 6-9, 2014, Paper 14067.
International Search Report and Written Opinion for International PCT Application No. PCT/US2020/040654, dated Dec. 3, 2020.

* cited by examiner

ELONGATE SIC FUEL ELEMENTS

STATEMENT REGARDING GOVERNMENT RIGHTS

This invention was made with government support under Contract No. DE-NE0008824 awarded by the Department of Energy. The U.S. Government has certain rights in this invention.

BACKGROUND OF THE INVENTION

1. Field of the Invention

The invention relates to fuel elements for nuclear power plants and more particularly to elongated fuel segments contained within elongated SiC cladding.

2. Description of the Prior Art

Silicon carbide (SiC) has been shown to be a very promising accident tolerant fuel (ATF) cladding, but one of the main challenges of SiC is that the fuel pellets housed in the SiC cladding tubes cannot have strong contact with the cladding without the risk of losing hermeticity in the SiC cladding.

$UO_2$ fuel has a long and successful history of use in the nuclear industry. While $UO_2$ has low reactivity with light water coolants, moderate swelling and stable structure during irradiation, it suffers from low thermal conductivity which limits its use to small diameter fuel rods. In use, fission products will cause swelling of the $UO_2$ and unless there is a large enough initial gap between the fuel pellets and a non-ductile cladding such as SiC, the inevitable swelling leads to cladding failure from strong mechanical interaction between the pellet and cladding (PCMI). Increasing the initial pellet-cladding gap to solve the PCMI issue will cause even higher fuel centerline temperature due to the low thermal conductivity of helium gas in the gap and reduced uranium loading. This drawback becomes evident when $UO_2$ is used in fuel rods with advanced, accident tolerant cladding such as SiC which requires minimal fuel to cladding mechanical interaction to avoid cracking and loss of hermeticity. Therefore, the use of $UO_2$ in SiC cladding is not possible for cylindrical fuel rod geometry without severe economic penalties.

Fuels such as $U_3Si_2$, UN, and uranium alloys, on the other hand, can mitigate the PCMI issue due to their high fuel thermal conductivity and reduced fuel centerline temperature by leaving a larger pellet-cladding gap, but at the cost of reduced uranium loading. Furthermore, these fuels have poor water corrosion resistance, which is detrimental during a leaker event in a light water reactor because of the compromise to the accident tolerance of the fuel.

For metal claddings such as Zr, which has a strain capability of 2 to 4%, the gap is not a PCMI issue but merely needs to be large enough to load the fuel pellets. However, if a leak occurs, $U_3Si_2$, for example, will undergo oxidation, increasing the internal volume in the Zr cladding. The increased volume causes the cladding to balloon out resulting in blockage of the coolant path.

SiC cladding has improved high temperature performance during accident conditions over traditional Zr based materials. However, the rod type fuel design has limited the potential of SiC material since SiC has a limited strain capability (~0.04 to 0.1%) to relieve local stress build up and minimize mechanical interaction between fuel and cladding. The approach to solving this problem has been to leave a large fuel-cladding gap. However, the large gap will significantly increase fuel centerline temperature, especially in a low thermal conductivity fuel such as $UO_2$, resulting in a large fission gas release and/or swelling and also reduce the uranium loading resulting in a severe economic penalty.

Plate fuels, such as those disclosed in U.S. Pat. Nos. 3,173,843; 3,297,543; 3,586,745; 3,855,061; 4,038,135; and 4,224,106, developed initially in the 1960s and 1970s used metal cladding (e.g., aluminum or zirconium alloys) and metallic fuel or fuel dispersed in metallic matrix (e.g., UZr or UMo). Such plate fuels were found not to be suitable for commercial reactors and abandoned, but are currently used in test reactors and have been evaluated for use in small modular reactors. See Mark D. DeHart, "*Fuel Element Design and Analysis for Potential LEU Conversion of the Advanced Test Reactor,*" INL/JOU-17-41538 Revision 0, April 2018; Samuel J. Miller, et al., "*Evaluation of $U_{10}Mo$ Fuel Plate Irradiation Behavior Via Numerical and Experimental Benchmarking*" INL/CON-12-25074, November 2012; and Min-Gil Kim, et al., "*Comparison of Thermal Hydraulic Performances of Rod Type Fuel to Plate-Type Fuel for Small Modular Reactor Application,*" Proceedings of ICAPP, April 2014.

SUMMARY OF THE INVENTION

The following summary is provided to facilitate an understanding of some of the innovative features unique to the embodiments disclosed and is not intended to be a full description. A full appreciation of the various aspects of the embodiments can be gained by taking the entire specification, claims, and abstract as a whole.

To address the problems arising from pellet cladding mechanical interaction between SiC cladding and nuclear fuel, while simultaneously providing the benefit of more uranium loading and better safety margins, especially in light water reactors, a new fuel element is described herein comprised of an elongate shaped fuel with elongate shaped SiC cladding.

In various aspects, the fuel element for use in a nuclear reactor includes a silicon carbide cladding and a nuclear fuel housed within the cladding. The cladding has two opposing elongated walls and two opposing end walls shorter than the elongated walls. Together, the elongated walls and the end walls define an enclosure. The enclosure has a length from end wall to end wall and a width from elongated wall to elongated wall and the cladding has a longitudinal axis and a transverse axis perpendicular to the longitudinal axis. The nuclear fuel has two elongated surfaces and two end surfaces shorter than the elongated surfaces. Prior to swelling in use, each of the two elongated surfaces are minimally spaced (for example, between about 0.05 to 2.0 mm) at a first distance from, and in a facing relationship to, a different one of the elongated walls of the cladding, and each of the end surfaces are spaced at a second distance from, and in facing relationship to, a different one of the end walls of the cladding. The second distance is greater than the first distance. The first and second distances are dimensioned such that, in use, when the fuel swells, the swollen fuel swells beyond the first distance and up to but not beyond the second distance to deform the elongated walls of the cladding without deforming the end walls of the cladding and without straining the cladding more 0.1%.

The strain on the cladding due to swelling of the fuel is in various aspects, no more than 0.05%.

The second distance defines a gap between the fuel end surfaces and the cladding end walls that is dimensioned to allow for the maximum swelling of the selected fuel plus space for fission gases produced in use. Those skilled in the art can calculate by known means or determine by historical use, the maximum amount of swelling the selected fuel will undergo in use and the amount of fission gas that would be produced in use to determine the second distance. The first distance defines a gap between each of the elongated walls of the cladding and the facing elongated surface of the fuel. The first distance gap is sufficient to allow the fuel to be inserted into the cladding prior to use, typically about 0.07 mm.

The fuel may, in certain aspects, be configured in cross-section in an elliptical shape defining a vertex at each of the shorter end surfaces, with the two elongated surfaces being convexly curved. The elliptical shape has a major axis extending from vertex to vertex, and a minor axis perpendicular to the major axis. Each convexly curved surface has a co-vertex at the minor axis and curves from the co-vertex to, and meets, each vertex. The first distance in this embodiment is smallest between the co-vertexes and the elongated walls of the cladding.

In certain aspects of the fuel element, the elongated walls of the cladding may curve inwardly towards the fuel. Prior to deformation in use, the elongate walls of the cladding may curve concavely inwardly towards the fuel, and in use, are deformed outwardly. The end walls of the cladding in various aspects, may be flat prior to use and remain flat in use.

Prior to swelling in use, the elongate surfaces of the fuel may curve concavely inwardly towards each other, and in use, swell outwardly to form a convexly curved elongated surfaces that extend beyond the first distance to deform the elongate walls of the cladding. Each concavely curved elongated surface defines a co-vertex at the minor axis and curves from the co-vertex to, and meets, each end surface. Prior to swelling in use, the end surfaces of the fuel may be flat, and in use, swell outwardly to form convexly curved end surfaces. Alternatively, prior to swelling in use, the end surfaces of the fuel may be flat, and in use, remain flat.

In various aspects, prior to swelling in use, the fuel may be configured in cross-section in a rectilinear shape defining flat end surfaces and flat elongated surfaces. The rectilinear shape defines a major axis extending from end surface to end surface, and a minor axis perpendicular to the major axis. In use, the fuel swells outwardly along both the major and minor axes to form, in cross-section, an elliptical configuration. Prior to swelling in use, the cladding may be configured in cross-section in a rectilinear shape defining flat end walls and flat elongated walls which deform outwardly when in use, the fuel swells.

In various aspects, the end walls of the cladding are thicker in cross-section than the elongated walls of the cladding.

The fuel may be a fissile material selected from the group consisting of $UO_2$, $U_3Si_2$, UN, and a uranium alloy.

The elongate shaped fuel with elongate shaped SiC cladding enables use of the proven benefits of fuels, such as $UO_2$, along with the accident tolerant features of SiC cladding material without compromising the fuel performance both during normal operations and under transient conditions. The proposed elongate shaped SiC cladding with elongate shaped fuel and end gaps allowing for fuel expansion offers benefits such as improved heat transfer with small gap or direct contact between fuel and cladding. The elongated SiC cladding with elongated fuel also will result in lower fuel temperatures due to the minimal gap throughout the life of the fuel, which will result in less fission gas release and swelling, less deformation on the cladding during transient events due to low temperature increases, and reduced tensile stress upon hard contact between fuel and cladding due to the increased span of the allowed cladding bulge. The elongated cladding surface can optionally be pre-curved to further mitigate local stress build up. The SiC clad elongated fuel described herein allows for the use of $UO_2$ fuel without compromising the economics of $UO_2$ or the accident tolerant features of SiC.

BRIEF DESCRIPTION OF THE DRAWINGS

The characteristics and advantages of the present disclosure may be better understood by reference to the accompanying figures.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, upward, down, downward, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 1:
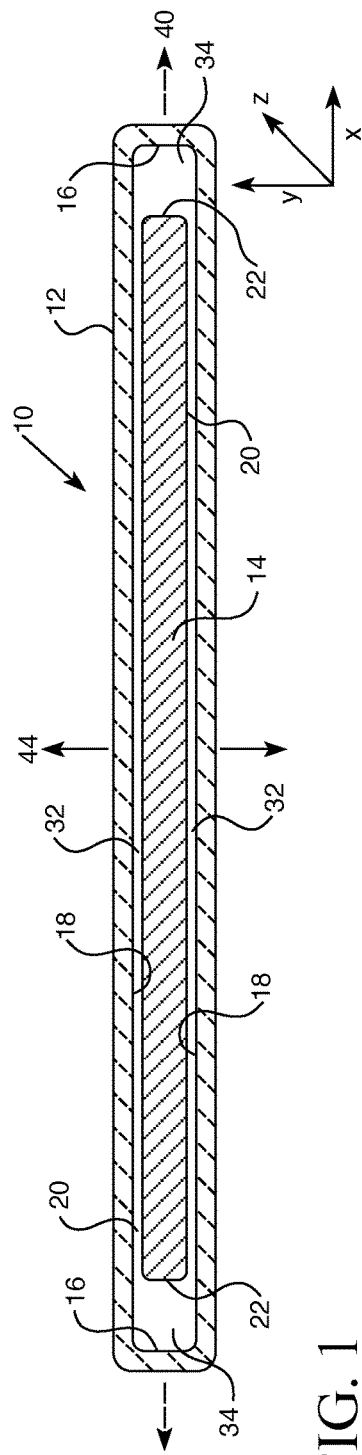
FIG. 1 is a schematic illustration of a top plan sectional view of an embodiment of an elongated fuel element in its initial configuration.

Referring to FIG. 1, a fuel element 10 as it would be initially configured prior to use is shown. The fuel element 10 includes an elongate shaped SiC cladding 12 enclosing a nuclear fuel segment 14. The cladding 12 is shown in cross-section as an elongate rectangular structure for housing the elongated fuel segment 14. The cladding 12 in its initial configuration has two opposing elongated walls 18 and two opposing shorter end walls 16. The fuel segment 14 also has two initially parallel or substantially parallel elongate side surfaces 20 and two relatively shorter end surfaces 22 relative to the segment's elongate side surfaces. The fuel segment 14 is sized relative to the cladding 12 so that there is a small gap 32 at a first distance between the elongated walls 18 of the cladding and the elongate side surfaces 20 of the fuel segment 14 allowing just enough space for the segments to be loaded and stacked in the cladding 12. There is a larger gap 34 at each end of the cladding 12 at a second distance between the end walls 16 of the cladding 12 and the end surfaces 22 of the segment 14. The larger gap 34 is larger than the small gap 32. Gap 34 is sized to allow fission gases to accumulate at a pressure less than the design pressure of the reactor (for instance 2200 psia at 320° C. for a traditional pressure water reactor (PWR).

Figure 2:
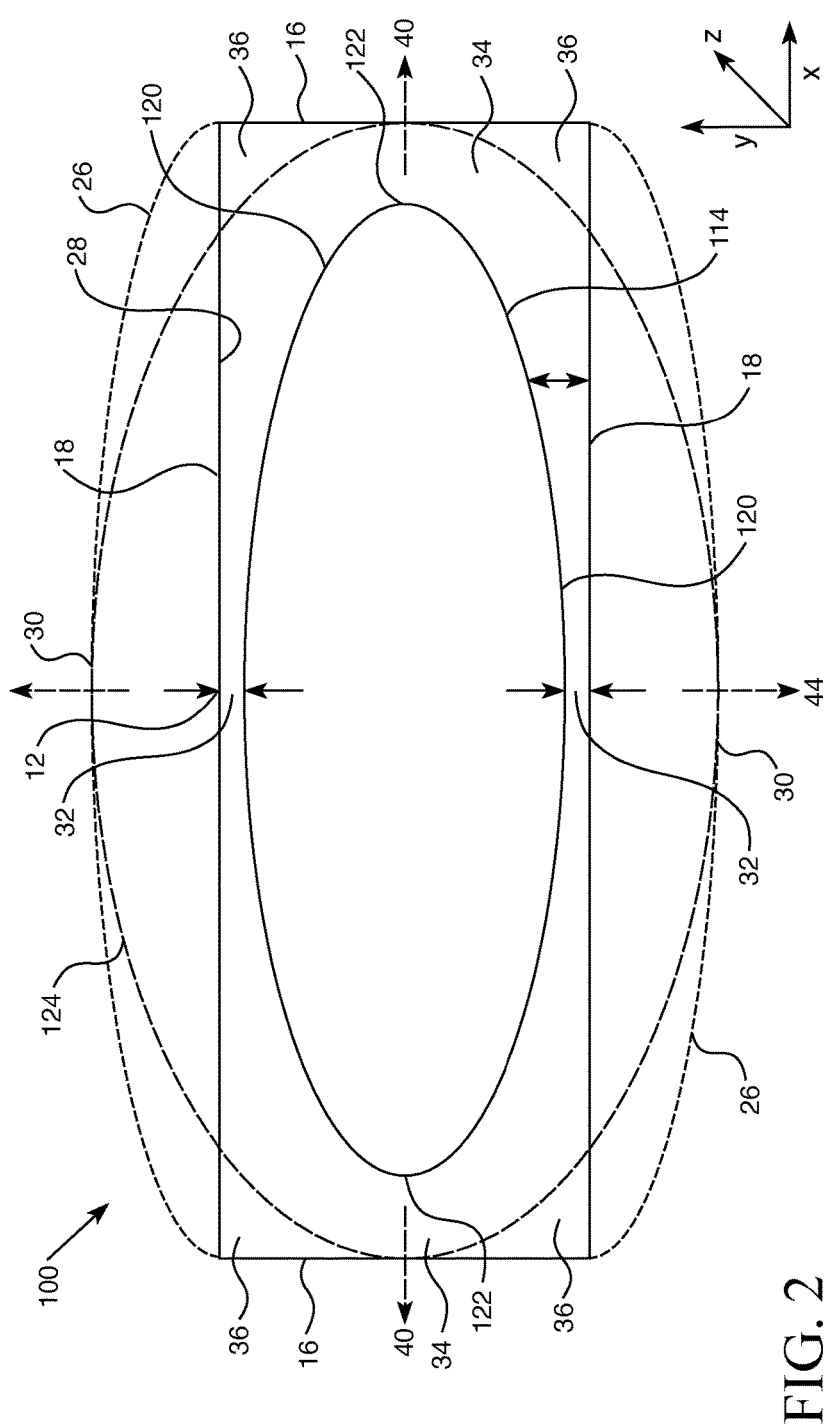
FIG. 2 is a schematic illustration of a top plan sectional view of an alternative embodiment of an elongated fuel element showing a convexly shaped fuel segment and elongated cladding in their initial configuration (solid lines) compared to the configuration of the swelling fuel segment (dashed lines) and cladding deformation (dashed lines) when in use.

In use, at the beginning of the fuel life cycle, the fuel segment 14 swells. Fuel is isotropic, so it will expand evenly in all directions. With the elongate cladding and fuel configurations described herein, the elongated walls 18 present a force that prevents the fuel from swelling freely in the transverse direction (i.e., along the Y axis as shown in FIGS. 1 and 2). Because of the smaller gaps 32 along the long edge of walls 18, the expanding fuel will press against walls 18 of cladding 12 first and deform elongated walls 18 outwardly. However, it is believed that the resistance to swelling from elongated walls 18 means the fuel will become anisotropic and will expand more in the direction with less resistance, along the longitudinal axis of the cladding (i.e., along the X axis as shown in FIGS. 1 and 2). Because of the larger end gaps 34 and the length of the elongated walls 18 of cladding 12, the swelling fuel segment 14 will expand into gap 34 and the force exerted by the swelling segment 14 on elongated walls 18 along the axis 44 will spread over a longer distance (from axis 44 to end walls 16), resulting in less overall strain over the distance from axis 44 to end walls 16) on the cladding 12. The larger end gaps 34 allow longitudinal expansion of segment 14 without applying any appreciable force or hard contact between the end surfaces 22 of segment 14 and end walls 16 of cladding 12. Hard contact, as used herein, refers to contact between the segment 14 and the walls of the cladding, particularly contact that exerts any force against the cladding walls. SiC can tolerate a strain of about 0.04% to 0.1%, and in various aspects, about 0.05% to 0.07%, before cracking, so spreading the strain caused by the swelling of fuel segments 14 over the longer length of walls 18 limits the overall increase in strain above the applicable percentage threshold.

In various aspects, the fuel segment can have a convex shape, as shown in FIG. 2, since the center of the cladding walls 18 can withstand a large displacement in the Y direction along axis 44 due to the width (in the direction from axis 44 to end walls 16) of the fuel.

Referring to FIG. 2, an alternative embodiment of a fuel element 100 is shown. In this embodiment, the cladding 12 is the same as the cladding 12 of the fuel element 10 shown in FIG. 1. Cladding 12 of fuel element 100 is, in cross-section, an elongate rectangular structure, also formed from SiC, and has in its initial configuration two opposing elongated walls 18 and two opposing shorter end walls 16, shown in solid lines. Fuel segment 114 of fuel element 100 in its initial configuration is oval, or elliptical, in cross-section, having two convexly curved elongated surfaces 120 and two end curves, or vertexes 122. A major axis is defined along the length of the elliptical segment 114 from vertex to vertex 122 and a minor axis, shorter and perpendicular to the major axis is defined across the width of the ellipse.

In a preferred loading style, the major axis of the segment 114 will align with and be co-axial to the longitudinal axis 40 of cladding 12 and the minor axis will be in alignment with a co-axial to the transverse axis 44 of the cladding. Some deviation from the preferred alignment can be tolerated, as long as the end gaps 34 allow swelling of the segment 114 without increasing the strain on the cladding 12, as described above.

The fuel segment 114 is sized relative to the cladding 12 so that there is a small gap 32 between the elongated walls 18 of the cladding and the widest areas (referred to as the co-vertexes of the ellipse, along the minor axis) of the longer, convexly curved elongated surfaces 120 of fuel segment 114 allowing just enough space at the widest areas of the pellet for the segments 114 to be loaded and stacked in the cladding 12 without applying contact pressure against the interior surface 28 of the cladding 12 during loading. Because of the elliptical shape, the gap 32 widens into a gap 36 as the segment 114 curves from each co-vertex toward the ends, or vertexes 122. The fuel segment 114 is sized relative to the cladding 12 so that there is a larger gap 34 relative to the small gap 32 at each end of the cladding 12 between the end walls 16 of the cladding 12 and the end curves, or vertexes 122 of the segment 114. This shape will encourage the lateral expansion of the fuel 114 toward the end gaps 34 and maximizes fuel loading. Since there is no fuel at the end gaps 34, the SiC cladding 12 at the end walls 16 can be thickened and strengthened without impacting heat transfer and fuel temperature.

FIG. 2 also illustrates, in dashed lines, the configuration of the cladding 12 and the fuel segment 114 after a period of use at the beginning of the fuel life cycle when the segment 114 swells to the swollen configuration 124 deforming the elongated walls 18 of the cladding 12 to the deformed configuration 26. As the fuel segment 114 swells, the convexly curved elongated sides 120 expand outwardly, contacting the elongated side walls 18 of the cladding 12 at contact area 30, at the widest points (co-vertexes) along the width of segment 114 pushing the cladding walls outwardly. The larger gaps 34 between segment vertexes 122 and cladding end walls 16 are dimensioned such that, when the segment 114 swells to its maximum dimensions, the vertexes 122 may (but need not) just touch the end walls 16, but do not apply any appreciable or effective force against end walls 16 of cladding 12 that would increase the strain on the cladding 12. Alternatively, when the segment 114 swells to its maximum dimensions, the vertexes 122 do not contact the end walls 16, leaving a smaller gap 34'. In either case, end walls 16 are not deformed due to the swelling of the segment 114. The curved shape of segment 114, even when swollen within the rectangular cladding 12 leaves gaps 36 to accommodate fission gases released during operation of a reactor using fuel elements 100.

The second distance which defines gap 34 between the fuel end surfaces 22/122 and the cladding end walls 16 in the initial configuration, before any swelling, is dimensioned to allow for the maximum swelling of the selected fuel plus space for fission gases produced in use. Those skilled in the art can calculate by known means or determine by historical use, the maximum amount of swelling the selected fuel will undergo in use and the amount of fission gas that would be produced in use to determine the second distance. Gap 34 is sized to allow fission gases to accumulate at a pressure less than the design pressure of the reactor (for instance 2200 psia at 320° C. for a traditional PWR).

The first distance defines gap 32 between the elongated walls 18 of the cladding 12 and the elongated surfaces 20/120 of the fuel in the initial configuration, before any swelling. The first distance gap 32 is sufficient to allow the fuel to be inserted into the cladding prior to use, typically about 0.07 mm.

Since the SiC cladding 12 will bulge outwardly after short irradiation times, in various aspects, the cladding elongated walls 18 can be pre-curved inward, in a concave shape, toward the fuel segment, to accommodate displacement during irradiation and mitigate local stress build up. This occurs because the initial expansion of the fuel segment puts compressive rather than tensional forces on the cladding. The concave curve as the initial configuration will mitigate the stress build up from the SiC swelling gradient. In addition, or alternatively, the fuel can be concavely shaped to minimize stress in the direction of the minor axis 44.

Figure 3:
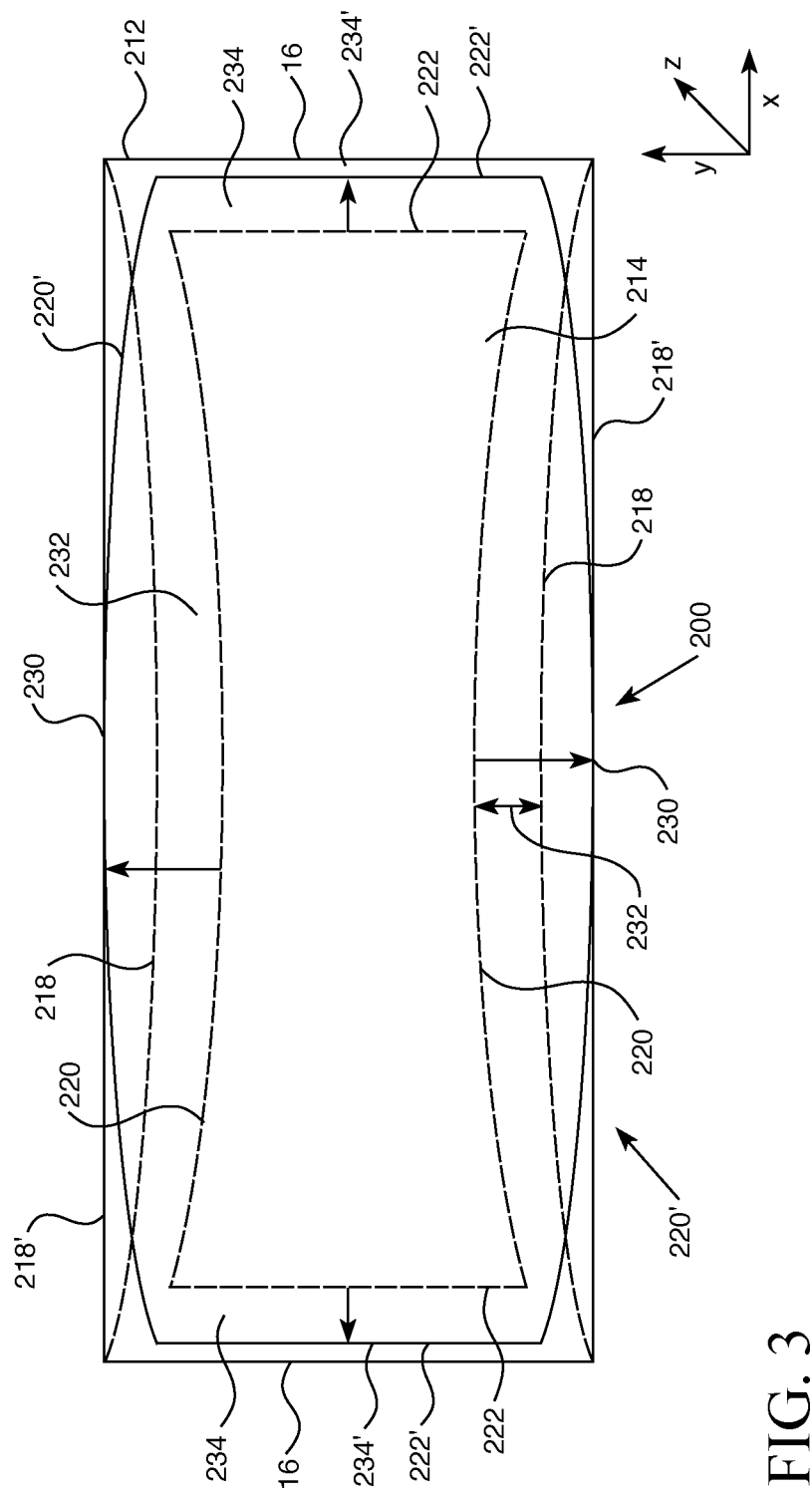
FIG. 3 is a schematic illustration of a top plan sectional view of another embodiment of the fuel element showing a pre-curved cladding wall and a pre-curved fuel segment in their initial configurations (dashed lines) and after swelling of the fuel and deformation of the cladding (solid lines).

Referring to FIG. 3, an alternative initial configuration of a fuel element 200 is shown in dashed lines and the configuration after swelling is shown in solid lines. In various aspects, fuel element 200 includes a fuel segment 214 having concavely shaped elongate surfaces 220 in an initial configuration that swell to convexly shaped surfaces 220'. The fuel element 214 has flat or curved end surfaces 222 that expand outwardly upon swelling to flat surfaces 222'. The cladding 212 may have either rectilinear, flat walls as in fuel element 10, or may include elongated walls 218 having an initial concave configuration (dashed lines) that swell to move the walls 218 into a flatter elongated wall 218' configuration (solid lines), giving the cladding 212 an overall rectangular shape. The walls 218 may also be expanded outward to a convex shape in which case the final shape is lens shaped and not rectilinear. FIG. 3 shows both the cladding and the fuel element in an initial concavely shaped configuration. However, the fuel element 214 may be inserted in a cladding 12, like that shown in FIGS. 1 and 2, through the top of the fuel element.

Like fuel elements 10 and 100, a smaller gap 232 is provided between elongated walls 218 of the cladding and elongated surfaces 220 of the fuel segment in the initial configuration. Upon swelling, the gap 232 closes at a contact area 230 between the walls 218' and the surfaces 220' along the transverse axis 44 as the fuel element elongated concave surfaces 220 expand in the Y direction to elongated convex surfaces 220'. In the initial configuration, a larger gap 234 is provided between each end wall 16 of the cladding 214 and the facing end surface 222 of the fuel segment 214. Upon swelling, the larger end gaps 234 on each end close to a smaller, but still present gap 234', as the fuel element 214 expands along the longitudinal axis 40, in the X direction.

The center of the cladding walls 218 can withstand a large displacement in the Y direction along axis 44 due to the width (in the direction from axis 44 to end walls 16) of the fuel segment 214. This shape will encourage the lateral expansion of the fuel 214 toward the end gaps 234 and maximize fuel loading. Since there is no fuel at the end gaps 234, the SiC cladding 212 at the end walls 16 can be thickened and strengthened without impacting heat transfer and fuel temperature.

The SiC cladding may preferably be made of a material such as a SiC monolith, SiC fibers, or a combination of the two, as taught in U.S. Pat. Nos. 6,246,740; 5,391,428; 5,338,576; and 5,182,077, and U.S. Patent Application Publications 2006/0039524, 2007/0189952; and 2015/0078505, the relevant portions of which are incorporated herein by reference. In various aspects, the ceramic yarn is formed from SiC fibers. The SiC fiber may preferably be a SiC fiber containing primarily Si and C, and some trace or relatively small amounts of O. Exemplary amounts may include Si: 50% to 70% (more preferably 68% to 70%) by weight
C: 30% to 40% (more preferably 30% to 32%) by weight
O: 0.01% to 14% (more preferably 0.01% to 0.5%) by weight.

The SiC fiber cladding would utilize SiC in the form of fiber tows with between 500 to 5000 fibers per tow and a thickness between 100 and 600 microns.

The fuel used in the fuel elements 10, 100 or 200 may be selected from known fissile materials for use in commercial nuclear reactors for energy production, such as, but not limited to, $UO_2$, $U_3Si_2$, UN, and uranium alloys and other oxide fuels. The fuel element design described herein, while able to accommodate any suitable known fuel, is particularly useful with $UO_2$, which had heretofore been unsuitable for use with SiC claddings.

Figure 4A:
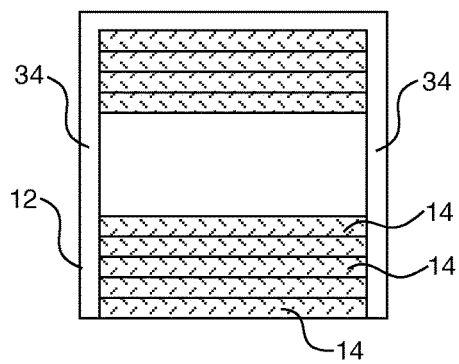
FIGS. 4A-D show a schematic illustration of a front (A), top (B), side (C) and alternative front (D) section views of an embodiment of fuel segments in an assembly wherein the fuel may be fabricated as one piece (D) or as stacked segments (A) and inserted into the cladding.
Figure 4B:
Figure 4C:
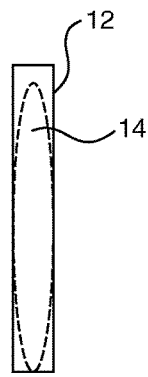
Figure 4D:
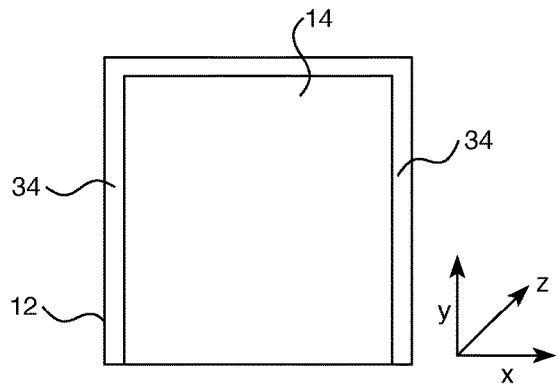
Figure 5A:
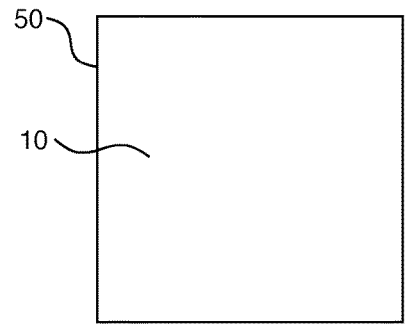
FIGS. 5 A-C show a schematic illustration of a front (A), top (B), and side (C) section view of the fuel element assembly of FIG. 4 inserted in a reactor core.
Figure 5B:
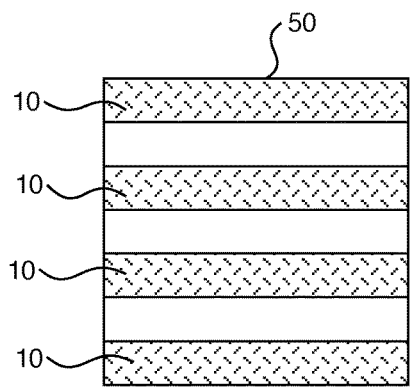
Figure 5C:
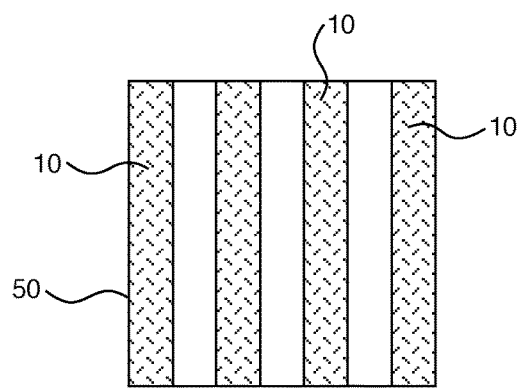

As shown in FIG. 4D, a fuel segment 14 (or 114 or 214), in embodiments where the fuel segment is one single piece, would be inserted into an elongate cladding 12 column, or as shown in FIG. 4A, a plurality of fuel segments 14 would be stacked, one on top of the other, in an elongate cladding 12 column. In each case, the fuel segment or segments 14, 114, or 214 will be generally centered along a vertical axis (the axis running in the Z direction perpendicular to the axes 40 and 44) and a transverse axis 44 (the axis running along the width and through the middle of the cladding 12 and pellet 14). A plurality of fuel elements 10, 100 or 200 are inserted into a fuel assembly 50, as shown in FIGS. 5A-C, in the core of a nuclear reactor.

As indicated above, silicon carbide is a very promising accident tolerant fuel cladding, but there were challenges in implementing SiC in traditional rod type fuels that the fuel element configurations described herein overcome. To prevent excess strain on the cylindrical rod type cladding, there is a uniform annular gap between the cylindrical rod cladding and the cylindrical fuel pellets which must be large enough to accommodate the fuel swelling in the radial direction after some time in the reactor, typically greater than 6 months. When the SiC cladding swells at the beginning of the fuel life cycle, it further expands the cladding, increasing the initial annular gap. At the beginning of the life cycle, the fuel shrinks. Because the fissile content is at its highest at the beginning of life, the fuel pellet generates the most heat at this time and combined with the initially shrinking pellet and swelling cladding, the widening initial gap presents a danger that the fuel pellet centerline temperature will exceed its melting point early in life. As the fuel cycle progresses, the pellet stops shrinking and begins to expand due to the buildup of fission products which are less dense than the original uranium fuel. Since the cladding swelling stops early in the cycle, the expanding pellet then has the possibility of contacting and breaking the SiC cladding. Because fuels such as $UO_2$ do not have a very good thermal conductivity, the wider gap negatively effects energy production by requiring the reactor to be run at low powers.

In the embodiments shown herein, the fuel-cladding gap is minimized, which minimizes the centerline temperature rise during transients and reduces the stored energy in the fuel. In addition, the fuel elements 10, 100, and 200 described herein provide a mechanism for the cladding 12 to accommodate fuel thermal expansion and swelling without suffering mechanical failure due to the force and resulting high strain that would otherwise be exerted against the cladding in prior rod type configurations.

The elongate shaped fuel 14, 114, and 214 with gaps 34 and 234 and elongate SiC cladding 12 described herein can accommodate contact between the swollen fuel and the cladding elongated walls 18 because the cladding 12 has the freedom to move laterally (in the direction of the axis 44 in the Y direction) and can tolerate strain to a greater extent from the fuel 14/114/214 due to the large expanse over the width (the distance from axis 44 to each end walls 16) of the elongate cladding. The elongated fuel design described herein also provides more expansion (in the direction of axis 40 in the X direction) for the fuel segments 14/114/214 within the longer walls 18 of cladding 12 under contact (depending on the length of the end gap 34 on the two end walls 16). The various embodiments of the fuel element 10, 100, 200 shown in FIGS. 1, 2 and 3, respectively, have the potential to significantly reduce fuel temperature and hence reduce contact load on the cladding during transients. Since the overall gap between the cladding and the fuel can be minimized, the elongate design described herein has the potential to load more fuel to improve fuel cycle costs.

In summary, the fuel elements 10, 100, and 200 provide the following benefits:

1. Improved heat transfer with smaller gap or direct contact between fuel and cladding as compared to a cylindrical fuel rod;
2. Larger fuel volume per reactor volume due to the absence of excessive initial gaps to accommodate future fuel swelling;
3. Lower fuel temperature due to the smaller gap resulting in less fission gas release and swelling;
4. Lower strain at localized deformation on the cladding during a transient due to a larger span of the face of the cladding;
5. Reduced tensile stress during hard contact between the fuel and cladding;
6. The long wall of the cladding surface can be pre-curved to further mitigate local stress build up or the fuel can be convexly shaped;
7. Allow using $UO_2$ fuel with no additives to increase thermal conductivity on accident tolerant feature and no additional manufacture cost;
8. Works with other innovative fuel materials, such as $U_3Si_2$, UN, and U-alloys; and
9. For the concave design, contact pressure is transformed into bending stress, particularly at the ends, to ensure compressive stress at outer layer for hermeticity.

The fuel elements 10, 100, and 200 described herein can utilize SiC cladding with $UO_2$ fuel with minimal initial gaps between the cladding and the fuel. The gaps 34/234 on the ends of the fuel elements 10/100/200 provide volume for fission gas and expansion of the fuel segments 14/114/214 along the major axis 40 which will reduce the stress on the cladding 12 compared to a rod design when the fuel segments 14/114/214 and cladding 12 are in contact. In certain aspects, the elongated side walls 18 of the SiC cladding can be pre-curved to mitigate the stress build up from SiC swelling gradient and/or the fuel can be convexly or concavely shaped to minimize stress in the direction of the minor axis 44.

The fuel elements 10, 100, and 200 described herein can significantly reduce the stress build up in SiC cladding and mitigate SiC mechanical failure from fuel-cladding mechanical interaction. The fuel elements 10, 100, and 200 enable the compatibility of SiC cladding with $UO_2$ in light water reactors and also work with other high thermal conductivity fuels, such as $U_3Si_2$, UN, and uranium alloys.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. An elongate plate fuel element for use in a nuclear reactor comprising:
    a silicon carbide cladding comprising:
        two opposing elongated walls; and
        two opposing end walls;
        wherein the elongated walls and the end walls define a rectangular enclosure, the rectangular enclosure having an enclosure length from end wall to end wall, an enclosure width from elongated wall to elongated wall, and an enclosure height defined by a height of the elongated walls and the end walls; and wherein the enclosure width is shorter than the enclosure length and shorter than the enclosure height; and nuclear fuel positioned within the rectangular enclosure, the fuel comprising:

two elongated surfaces; and two end surfaces;

wherein the fuel has a fuel length from end surface to end surface and a fuel width from elongated surface to elongated surface; and wherein the fuel width is shorter than the fuel length;

wherein each of the two elongated surfaces, prior to swelling in use, are minimally spaced at a first distance from, and in a facing relationship to, a different one of the elongated walls of the cladding, and each of the end surfaces, prior to swelling in use, are spaced at a second distance from, and in facing relationship to, a different one of the end walls of the cladding; and wherein the second distance is greater than the first distance, and the first and second distances are dimensioned such that, in use, when the fuel swells, the swollen fuel swells beyond the first distance and up to but not beyond the second distance to deform the elongated walls of the cladding without deforming the end walls of the cladding and without straining the cladding more than 0.1%.

2. The fuel element recited in claim 1 wherein the fuel is selected from the group consisting of $UO_2$, $U_3Si_2$, UN and a uranium alloy.

3. The fuel element recited in claim 1 wherein the fuel is $UO_2$.

4. The fuel element recited in claim 1 wherein the fuel is configured in cross-section in an elliptical shape defining a vertex at each of the shorter end surfaces and two convexly curved elongated surfaces, the elliptical shape having a major axis extending from vertex to vertex, and a minor axis perpendicular to the major axis.

5. The fuel element recited in claim 4 wherein each convexly curved elongated surface defines a co-vertex at the minor axis and curves from the co-vertex to, and meets, each vertex, and the first distance is smallest between the co-vertexes and the elongate walls of the cladding.

6. The fuel element recited in claim 1 wherein, prior to deformation in use, the elongate walls of the cladding curve concavely inwardly towards the fuel, and in use, are deformed outwardly.

7. The fuel element recited in claim 6 wherein, prior to swelling in use, the elongate surfaces of the fuel curve concavely inwardly towards each other, and in use, swell outwardly to form a convexly curved elongated surfaces that extend beyond the first distance to deform the elongate walls of the cladding.

8. The fuel element recited in claim 7 wherein, prior to swelling in use, the end surfaces of the fuel are flat, and in use, swell outwardly to form convexly curved end surfaces.

9. The fuel element recited in claim 7 wherein, prior to swelling in use, the end surfaces of the fuel are flat, and in use, the end surfaces remain flat.

10. The fuel element recited in claim 6 wherein, prior to swelling in use, the end walls of the cladding are flat.

11. The fuel element recited in claim 10 wherein, in use, the end walls remain flat.

12. The fuel element recited in claim 1 wherein the end walls of the cladding are thicker in cross-section than the elongated walls of the cladding.

13. The fuel element recited in claim 1 wherein the strain on the cladding due to swelling of the fuel is no more than 0.05%.

14. The fuel element recited in claim 1 wherein, prior to swelling in use, the elongate surfaces of the fuel curve concavely inwardly towards each other, and in use, swell outwardly to form a convexly curved elongated surfaces that extend beyond the first distance to deform the elongate walls of the cladding, the fuel having a major axis extending from end surface to end surface, and a minor axis perpendicular to the major axis.

15. The fuel element recited in claim 14 wherein each concavely curved surface defines a co-vertex at the minor axis and curves from the co-vertex to, and meets, each end surface.

16. The fuel element recited in claim 15 wherein, prior to swelling in use, the end surfaces of the fuel define flat surfaces, and in use, swell outwardly to form convexly curved end surfaces.

17. The fuel element recited in claim 15 wherein, prior to swelling in use, the end surfaces of the fuel define flat surfaces, and in use, the end surfaces remain flat.

18. The fuel element recited in claim 1 wherein, prior to swelling in use, the fuel is configured in cross-section in a rectilinear shape defining flat end surfaces and flat elongated surfaces, the rectilinear shape having a major axis extending from end surface to end surface, and a minor axis perpendicular to the major axis.

19. The fuel element recited in claim 18 wherein, in use, the fuel swells outwardly along both the major and minor axes to form, in cross-section, an elliptical configuration.

20. The fuel element recited in claim 18 wherein, prior to swelling in use, the cladding is configured in cross-section in a rectilinear shape defining flat end walls and flat elongated walls, the elongated walls deforming outwardly when in use, the fuel swells.

* * * * *